United States Patent
Yanagida et al.

(10) Patent No.: US 6,720,742 B2
(45) Date of Patent: Apr. 13, 2004

(54) LIGHT CONTROL DEVICE, METHOD FOR DRIVING SAME AND PICKUP DEVICE USING THE LIGHT CONTROL DEVICE

(76) Inventors: Toshiharu Yanagida, c/o Sony Corporation 7-35, Kitashinagawa 6-Chome, Shinagawa-ku, Tokyo (JP); Toru Udaka, c/o Sony Corporation 7-35, Kitashinagawa 6-Chome, Shinagawa-ku, Tokyo (JP); Masaru Kawabata, c/o Sony Corporation 7-35, Kitashinagawa 6-Chome, Shinagawa-ku, Tokyo (JP); Kazuhiro Tanaka, c/o Sony Corporation 7-35, Kitashinagawa 6-Chome, Shinagawa-ku, Tokyo (JP)

(*) Notice: Subject to any disclaimer, the term of this patent is extended or adjusted under 35 U.S.C. 154(b) by 0 days.

(21) Appl. No.: 09/974,565

(22) Filed: Oct. 10, 2001

(65) Prior Publication Data

US 2002/0079847 A1 Jun. 27, 2002

(30) Foreign Application Priority Data

Oct. 12, 2000 (JP) .................................. P2000-311501

(51) Int. Cl.[7] .............................. G05F 1/00; H01T 13/56
(52) U.S. Cl. ...................................... 315/291; 313/121
(58) Field of Search ................................. 315/149, 150, 315/156, 157; 396/121, 147, 213, 235, 237, 246

(56) References Cited

U.S. PATENT DOCUMENTS

| | | | |
|---|---|---|---|
| 4,485,405 A | * 11/1984 | Bailey | 348/230.1 |
| 5,627,627 A | * 5/1997 | Suzuki | 355/68 |
| 6,069,620 A | 5/2000 | Nakamura et al. | |
| 6,167,203 A | * 12/2000 | Ishimaru et al. | 396/284 |
| 6,347,190 B1 | * 2/2002 | Ishimaru | 396/121 |
| 6,529,253 B1 | * 3/2003 | Matsute | 349/96 |

FOREIGN PATENT DOCUMENTS

| | | |
|---|---|---|
| EP | 0 875 881 A2 | 11/1998 |
| JP | 2000-149309 A | 5/2000 |

OTHER PUBLICATIONS

Kobayashi Y. et al., "The Application of a Bistable Device to Reflective Guest–HostLCDS" SID International Symposium Digest of Technical Papers, May 13–15, 1997, vol. 28, pp. 405–408, Boston.

* cited by examiner

*Primary Examiner*—Don Wong
*Assistant Examiner*—Minh D A
(74) *Attorney, Agent, or Firm*—Robert J. Depke; Holland & Knight LLP

(57) ABSTRACT

A light control device comprises a liquid crystal cell 12, and a pulse control unit 62 or 64 wherein when a transmittance of light transmitted from said liquid crystal element is changed from an actual light transmittance to an intended light transmittance, the pulse control unit is able to insert beforehand a drive pulse for control corresponding to a minimum light transmittance or a maximum light transmittance, at least, prior to application of a drive pulse corresponding to the intended light transmittance. A method of driving the light control device is also described wherein the light control device is driven by use of the drive pulse for control, along with a pickup device wherein the light control device is arranged in a light path of a pickup system.

14 Claims, 11 Drawing Sheets

±5V→0V

±3V→±2V

±3V→0V
(18ms)
→±2V

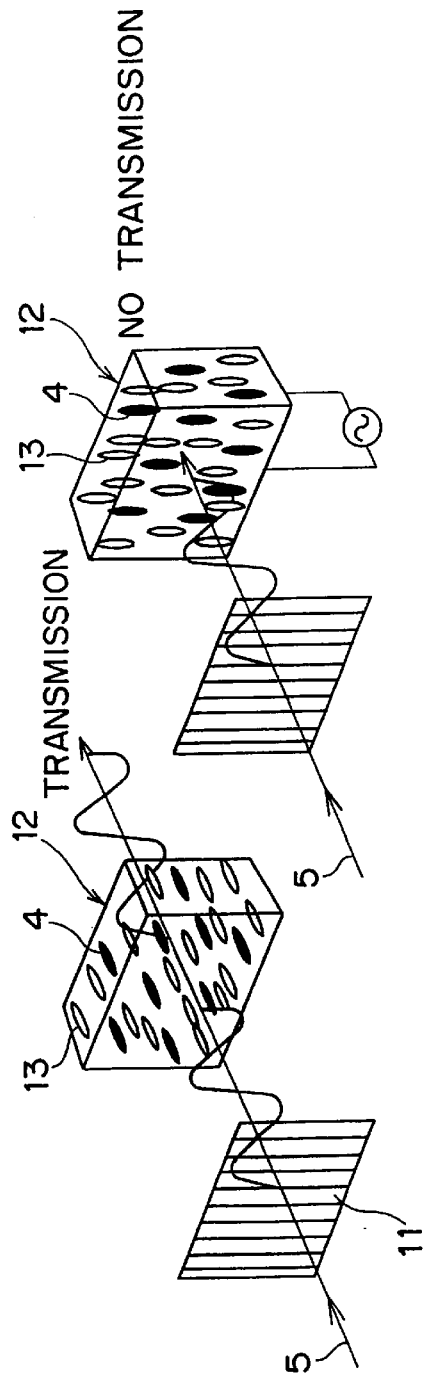
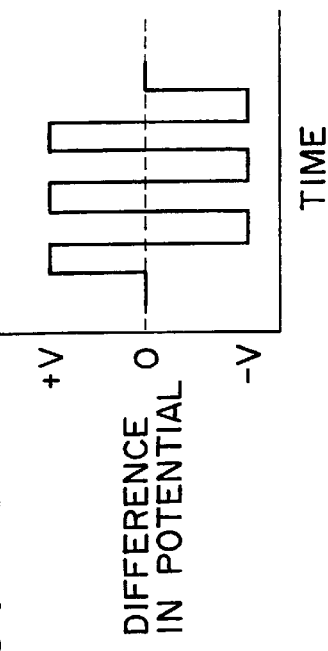
FIG.5A  FIG.5B  FIG.5C

FIG. 8
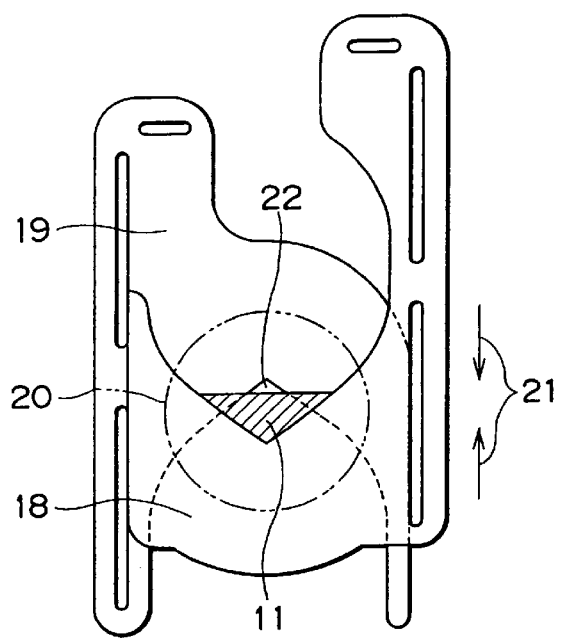
FIG. 9A
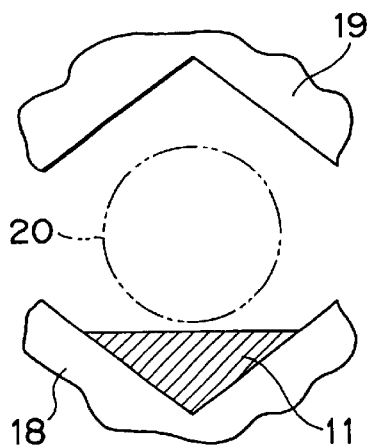
FIG. 9B
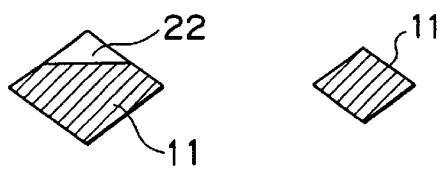
FIG. 9C

NO APPLICATION OF VOLTAGE

APPLICATION OF VOLTAGE

LIGHT CONTROL DEVICE, METHOD FOR DRIVING SAME AND PICKUP DEVICE USING THE LIGHT CONTROL DEVICE

RELATED APPLICATION DATA

The present application claims priority to Japanese Application No. P2000-311501 filed Oct. 12, 2000, which application is incorporated herein by reference to the extent permitted by law.

BACKGROUND OF THE INVENTION

This invention relates to a light control device wherein incident light is transmitted after control in quantity of the light and its driving method, and also to a pickup device using the light control device.

In general, a polarizer is used in a light control device using a liquid crystal cell. For the liquid crystal cell, there is used, for example, a TN (twisted nematic) liquid crystal cell or a guest-host (GH (guest-host)) liquid crystal cell.

FIGS. 13A and 13B are, respectively, a schematic view showing the working principle of a known light control device. This light control device is constituted mainly of a polarizer 1 and a GH cell 2. The GH cell 2 is sealed between two glass substrates and has working electrodes and liquid crystal alignment films (which are not particularly shown herein and whenever the cell is illustrated hereinafter). The GH cell 2 has liquid crystal molecules 3 and dichromatic dye molecules 4 sealed therein.

The dichromatic dye molecules 4 have anisotropy with respect to the absorption of light and are made, for example, of positive-type (p-type) dye molecules that absorb light along the major axis of the molecules. The liquid crystal molecules 3 have dielectric anisotropy of the positive type (p-type), for example.

FIG. 13A shows a state of the GH cell 2 in case where no voltage is applied thereto (or under conditions of applying no voltage). Incident light 5 is linearly polarized after transmission through the polarizer 1. In FIG. 13A, the direction of polarization and the direction of the major axis of the dichromatic dye molecules 4 are coincident with each other, so that the light is absorbed with the dichromatic dye molecules 4, thereby causing the transmittance of the GH cell 2 to be lowered.

When a voltage is applied to the GH cell 2 as shown in FIG. 13B, the liquid crystal molecules are turned toward a direction of an electric field, under which the direction of the major axis of the dichromatic dye molecules 4 becomes perpendicular to the direction of polarization of the linearly polarized light. Thus, the incident light 5 undergoes little absorption with the GH cell 2 and is transmitted.

In the GH cell 2 shown in FIGS. 13A and 13B, as a working voltage is applied thereto, the average transmittance of visible light (in air and when a light transmittance under conditions where a polarizer is used in addition to the liquid crystal cell is taken at a reference (=100%) herein and whenever it appears hereinafter) increases as is particularly shown in FIG. 14. However, a maximum light transmittance in case where a voltage is increased up to 10V is at approximately 60%, with the light transmittance being varied gently.

It will be noted that where negative type (n-type) dichromatic dye molecules capable of absorbing light along the direction of the minor axis of the molecules are used, the light is not absorbed under conditions of applying no voltage, but is absorbed when a voltage is applied thereto, unlike the case using the positive type dichromatic dye molecules 4.

With the light control device shown in FIGS. 13A and 13B, a ratio between the absorbances under voltage-applying conditions and no voltage-applying conditions, i.e. an optical density ratio, is at about 10. This optical density ratio is as high as about two times that of a light control device constituted of the GH cell alone without use of any polarizer 1.

For the drive of the above-stated light control device, drive pulses are changed in a stepwise manner when the light transmittance is changed. However, there arises the problem that depending on the structure of a liquid crystal cell used and the type of liquid crystal material, a response time in case where a light transmittance is slightly changed for half tone becomes much longer than that for a great stepwise response under transparent conditions (i.e. a maximum light transmittance) to light-intercepting conditions (i.e. a minimum light transmittance) or for a great stepwise response under light-intercepting conditions to transparent conditions.

SUMMARY OF THE INVENTION

It is accordingly an object of the invention to provide a light control device wherein where a liquid crystal element for light control is driven to realize a half tone, a change or relaxation in orientation of a liquid crystal is allowed to proceed smoothly, so that a response time of a light transmittance is caused to be shortened, thereby improving the performance, image quality and reliability of the light control device.

The invention contemplates to provide a light control device, which comprises a liquid crystal element, and a pulse control unit wherein when a transmittance of light outputted or transmitted from the liquid crystal element is changed from an actual light transmittance to an intended light transmittance, the pulse control unit is able to insert beforehand a drive pulse for control corresponding to a minimum light transmittance or a maximum light transmittance, at least, prior to insertion of a drive pulse corresponding to the intended light transmittance. The invention also contemplates to provide a method for driving the light control device by use of the drive pulse for control and to provide a pickup device having the light control device arranged in a light path of a pickup system.

According to the invention, the light transmittance of the liquid crystal element is slightly changed from an actual light transmittance to an intended light transmittance in a half tone region, a drive pulse for control corresponding to fully light-intercepting conditions (i.e. a minimum light transmittance) or fully transparent conditions (i.e. a maximum light transmittance) is appropriately inserted beforehand prior to application of a drive pulse corresponding to the intended light transmittance. As a result, the change or relaxation in orientation of the liquid crystal proceeds smoothly, so that a response time before the intended light transmittance is reached can be remarkably shortened over the case where a drive pulse corresponding to the intended light transmittance is merely applied to in a stepwise manner so as to drive the cell.

BRIEF DESCRIPTION OF THE DRAWINGS

FIG. 5A is a schematic view showing a working principle under no voltage-applying conditions;

FIG. 5B is a schematic view showing a working principle under voltage-applying conditions; and FIG. 5C is a schematic sectional view, and a waveform of an applied voltage;

FIG. 8 is a schematic front view showing a mechanical iris of the light control device of the invention;

FIGS. 9A, 9B and 9C are, respectively, a schematic, enlarged view of part of the mechanical iris showing the operations of the iris in the vicinity of an effective light path of the light control device of the invention;

EMBODIMENTS OF THE INVENTION

In the practice of the invention, the drive pulse for control should have, at least, a controlled pulse voltage and the number of pulses. The pulse voltage should preferably be equal to a pulse voltage capable of generating such a minimum light transmittance or maximum light transmittance as mentioned hereinabove, or a value between the first-mentioned pulse voltage and a pulse voltage capable of generating the intended light transmittance.

The drive pulse for control should have, at least, a controlled pulse width and pulse number, and the pulse width should preferably be equal to a pulse width capable of generating the minimum light transmittance or maximum light transmittance, or a value between the first-mentioned pulse width and a pulse width capable of generating the intended light transmittance.

The drive pulse for control may be controlled not only by the pulse voltage or pulse width, but also by a pulse density, or through combination thereof.

If the liquid crystal element should preferably be a guest-host type liquid crystal element making use of a negative type liquid crystal as a host material and a dichromatic dye as a guest material.

Such a liquid crystal element relies on the invention of earlier Japanese Patent Application No. Hei 11-322186, assigned to the same assignee. According to this invention, a light control device is constituted of a liquid crystal element and a polarizer arranged in a path of light incident on the liquid crystal element, and a guest-host type liquid crystal using a negative type liquid crystal as a host material. Eventually, a ratio between absorbances under no voltage applying conditions and voltage applying conditions (i.e. a ratio between optical densities) is improved with a great contrast ratio of the light control device. Thus, one is enabled to normally conduct light control operations in bright to dark places.

Figure 13A:
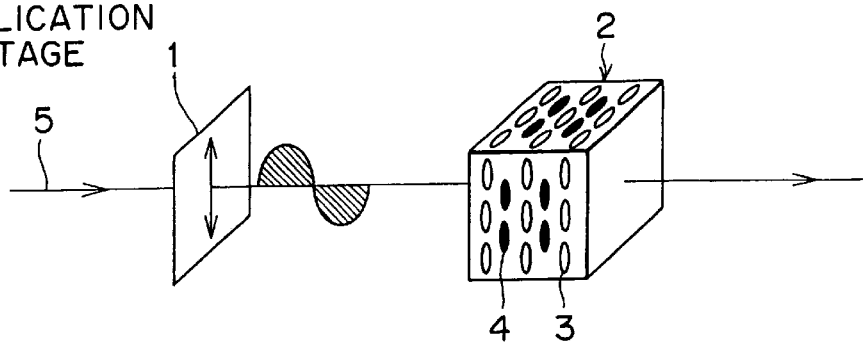
FIGS. 13A and 13B are, respectively, a schematic view showing the working principle of a conventional light control device.
Figure 13B:
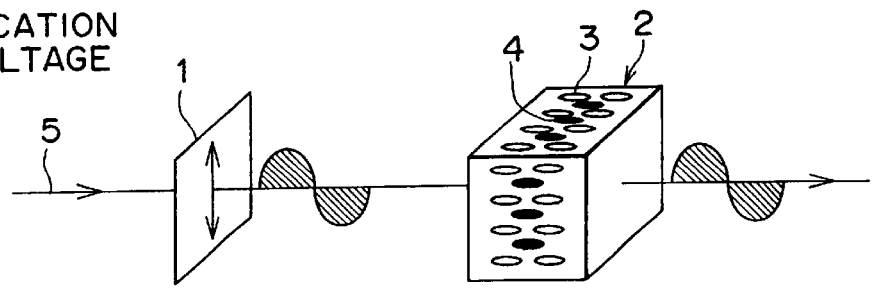
Figure 14:
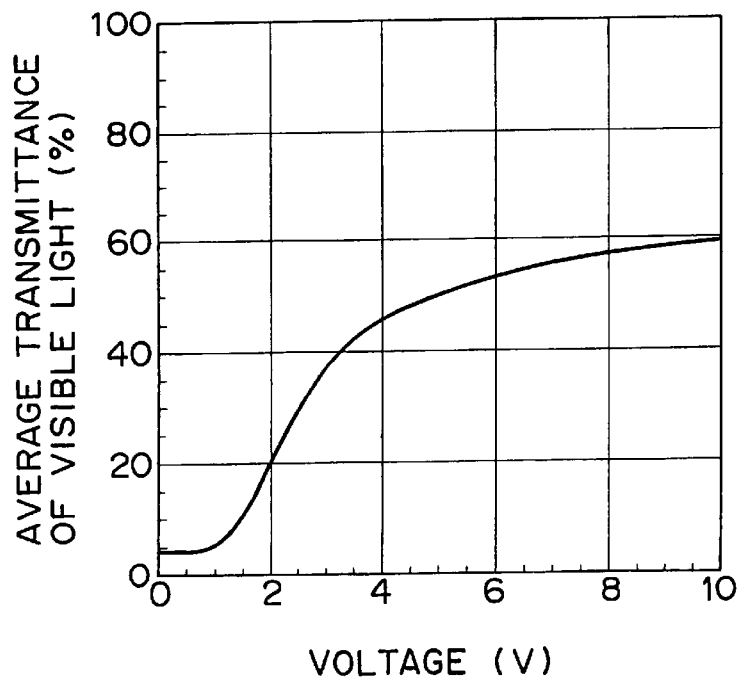
FIG. 14 is a graph showing the relation between the average light transmittance and the drive voltage of the conventional light control device.

In a guest-host type liquid cell (GH cell) 2 shown in FIGS. 13A and 13B, a positive type liquid crystal where a dielectric anisotropy ($\Delta\epsilon$ is positive is used as a host material, a positive type dye 4 which has dichromaticity and in which a light absorption anisotropy ($\Delta A$) is positive is used as a guest material 4, and a polarizer 1 is provided at an incident side of the GH cell 2. When a working voltage using a rectangular wave as a drive wave is applied to so as to measure a change of light transmittance, it has been found that, as shown in FIG. 14, as the working voltage increases, an average transmittance of visible light in air (wherein a transmittance through the liquid crystal cell along with the polarizer is taken as a reference (~100%) herein and whenever it appears hereinafter) increases. Nevertheless, when the voltage increases up to 10V, a maximum transmittance arrives at about 60%, with the change of the light transmittance being gentle.

This is considered for the reason that where a positive type host material is used, liquid crystal molecules whose director does not change (or undergoes little change) in the direction remain owing to the strong interaction of the liquid crystal molecules at the interface between the liquid crystal cell and the liquid crystal alignment film under conditions where no voltage is applied to.

Figure 6:
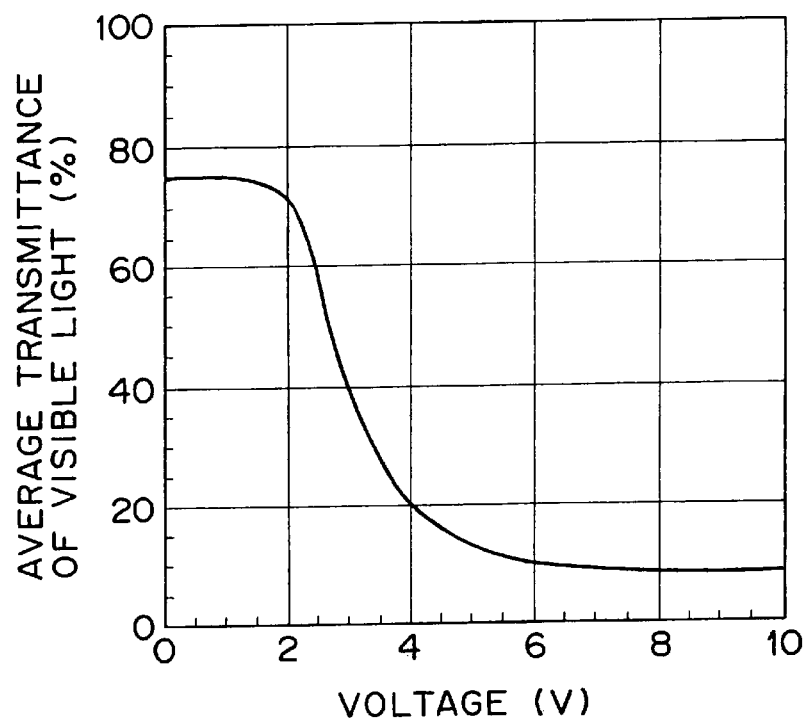
FIG. 6 is a graph showing the relation between the average light transmittance and the drive voltage of a light control device according to the invention.

In contrast, in the earlier invention, a guest-host type liquid crystal cell (GH cell) 12 is provided as shown in FIGS. 5A and 5B. In the cell 12, MLC-6608, made by Merck Co., & Inc., which is a liquid crystal of a negative type whose dielectric anisotropy ($\Delta\epsilon$) is negative is used as a host material 13, for example, and D5 of BDH Co., Ltd., which is a positive type dye having dichromaticity, is used, for example, as a guest material 4. In this arrangement, a polarizer 11 is provided at an incident side of the GH cell 12 to measure a change in light transmittance when a working voltage is applied thereto with a rectangular wave as a drive waveform. As a result, it has been found that as shown in FIG. 6, when the working voltage increases, the average transmittance (in air) of visible light is reduced to about 75% to several % of a maximum light transmittance, with the change of the light transmittance being relatively sharp.

This is considered for the reason that where a negative type host material is used under which the interaction of liquid crystal molecules at the interface of the liquid crystal cell and the light crystal alignment film is very weak under conditions of applying no voltage, light is likely to transmit under no voltage-applying conditions and the direction of directors of the liquid crystal molecules is likely to undergo a change along with a voltage being applied to.

In the practice of the invention, when the GH cell is constituted by use of a negative type host material in such a way as set out hereinabove, a light transmittance (especially, under transparent conditions) is improved, thus enabling one to realize a compact light control device ensuring the use of the GH cell fixed in position of a pickup optical system. In this case, when a polarizer is arranged in a light path of incident light on the liquid crystal element, a ratio between absorbances under no voltage-applying conditions and under voltage-applying conditions (i.e. a ratio between optical densities) is further improved, and the contrast ratio of the light control device becomes so great that light control operations can be normally performed in bright to dark places.

In the practice of the invention, the negative type liquid crystal in the liquid crystal element should preferably be negative with respect to the dielectric anisotropy, and the guest material may be made of positive or negative type dichromatic dye molecules. In addition, the host material should preferably be of the negative type and may be of the positive type.

In the invention, the negative (or positive) type host material and the positive (or negative) type guest material may be, respectively, selected from any known materials. In practice, these materials should be so selected as to exhibit nematic properties within an actually employed temperature range, and a composition made of a blend of these materials may be used.

Figure 7:
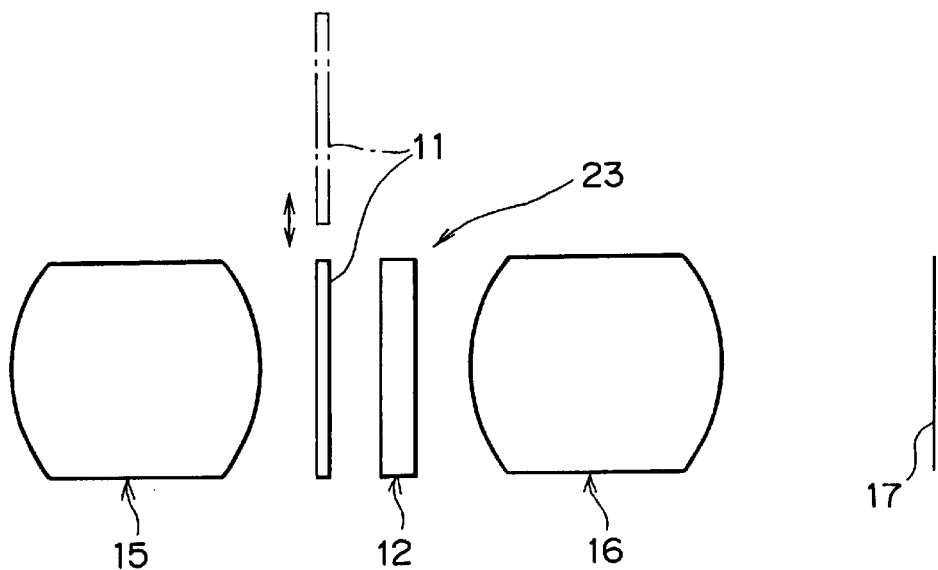
FIG. 7 is a schematic side view showing a light control device according to the invention.

As shown, for example, in FIG. 7, a light control device 23 consisting of such a GH cell 12 as set out hereinbefore is arranged between front group lenses 15 and rear group lenses 16, each constituted of a plurality lenses like a zoom lens. The light transmitted through the front group lenses 15 is linearly polarized via a polarizer 11 and enters into the GH cell 12. The light transmitted through the GH cell 12 is converged by means of the rear group lenses 16 and projected as a picture on an imaging surface 17.

The polarizer 11 of the light control device 23 is so designed as to be taken in or out relative to the effective light path of incident light on the GH cell 12, like the case of the afore-mentioned earlier application, assigned to the same applicant. More particularly, when moved to the position indicated by an imaginary line, the polarizer can be taken out from the effective light path. For a measure of taking the polarizer 11 in and out, there may be used such a mechanical iris as is particularly shown in FIG. 8.

This mechanical iris is a mechanical iris device usually employed for digital still cameras, video cameras and the like, and is composed mainly of two iris blades 18, 19, and a polarizer 11 attached to the iris blade 18. The iris blades 18, 19 can be vertically moved, respectively. The iris blades 18, 19 are relatively moved in the directions indicated by arrows 21 by use of a drive motor not shown.

In this way, as shown in FIG. 8, the iris blades 18, 19 are partially superposed. When the degree of the superposition becomes great, an opening 22 above the effective light path 20 located in the vicinity of the center of the iris blades 18, 19 is covered with the polarizer 11.

FIGS. 9A to 9C are, respectively, an enlarged view of part of the mechanical iris in the neighborhood of the effective light path 20. Simultaneously with the downward movement of the iris blade 18, the iris blade 19 moves upwardly. This entails, as shown in FIG. 9A, the movement of polarizer 11 attached to the iris blade 18 outside the effective light path 20. In contrast, when the iris blade 18 is moved upwardly or the iris blade 19 is moved downwardly, the iris blades 18, 19 are superposed with each other. Accordingly, the polarizer 11 moves on the effective light path 20 as shown in FIG. 9B, so that the opening 22 is gradually covered. When the degree of the mutual superposition of the iris blades 18, 19 becomes great, the polarizer 11 fully covers the opening 20 therewith as is particularly shown in FIG. 9C.

Next, the light control operation of the light control device 23 using the mechanical iris is illustrated.

As a subject, not shown, comes brighter, the iris blades 18, 19 that are made open in vertical directions as shown in FIG. 9A are driven with a motor not shown, and start to be superposed. This permits the polarizer 11 attached to the iris blade 18 to gradually enter into the effective light path 20, thereby covering part of the opening 22 therewith (see FIG. 9B).

At this stage, the GH cell 12 is in the state where no light is absorbed (although a slight degree of absorption with the GH cell 12 takes place such as by thermal fluctuation or surface reflection). Hence, the light passed through the polarizer 11 and the light passed through the opening 22 become substantially equal to each other with respect to the intensity distribution.

Thereafter, the polarizer 11 is in the state of fully covering the opening 22 (see FIG. 9C). Further, if the subject increases in brightness, a voltage applied to the GH cell 12 is increased so that light is absorbed in the GH cell to control the light intensity.

In contrast, where the subject becomes dark, a voltage applied to the GH cell 12 is reduced or no voltage is applied thereto, thereby causing the absorption of light with the GH cell 12 not to take place. When the subject becomes further darker, a motor, not shown, is driven to move the iris blade 18 downwardly and the iris blade 19 upwardly. In this manner, the polarizer 11 is moved outside the effective light path 20 (see FIG. 9A).

As is shown in FIGS. 7, 8 and 9A to 9C, since the polarizer (having a transmittance, for example, of 40% to 50%) can be moved outside the effective light path 20, the light is not absorbed with the polarizer 11. Accordingly, the maximum transmittance of the light control device can be increased, for example, to a level as high as two times or more. More particularly, this light control device has a maximum transmittance, for example, of about two times that of a conventional light control device composed of fixedly set polarizer and GH cell. It will be noted that minimum transmittances of both types of devices are substantially equal to each other.

The polarizer 11 is taken out or in by use of the mechanical iris that has been put into practice in the field of digital still cameras and the like, and thus, the light control device can be readily realized. Since the GH cell 12 is used, the GH cell 12 itself is able to absorb light in addition to the light control with the polarizer 11, thus contributing to the control of light.

In this way, the light control device of the invention ensures a high contrast ratio between brightness and darkness and also can keep substantially a uniform distribution of light quantity.

Preferred examples of the invention are described with reference to the accompanying drawings.

EXAMPLE 1

An example of a light control device using a guest-host type liquid crystal (GH) cell is now described.

As is shown in FIG. 7, the light control device of the invention is composed of a GH cell 12 and a polarizer 11. The GH cell 12 includes two glass substrates, on which transparent electrodes and alignment films (both not shown)

are, respectively, formed, and a mixture, which is made of negative type liquid crystal molecules (host material) and positive type dichromatic dye molecules (guest material), is sealed between the two glass substrates.

For the liquid crystal molecules, there was used, for example, MLC-6608, made by Merck Co., & Inc., which is a negative type liquid crystal whose dielectric anisotropy is negative, and for the dichromatic dye molecules, there was used D5, made by BDH, which is a positive type dye having anisotropy with respect to the absorption of light and capable of absorbing light along the direction of a major axis of the molecules. The light absorption axis of the polarizer 11 was intersected at right angles with respect to the light absorption axis at the time when a voltage is applied to the GH cell 12.

As shown, for example, in FIG. 7, the light control device 23 including the GH cell 12 was arranged between front group lenses 15 and rear group lenses 16, each constituted of a plurality of lenses as with a zoom lens system. The light transmitted through the front group lenses 15 was linearly polarized via the polarizer 11 and passed into the GH cell 12. The light transmitted through the GH cell 12 was converged with the rear group lenses 16 and projected as a picture on an imaging surface 17.

The polarizer 11 constituting the light control device 23 can be taken out or in relative to the effective path of light incident on the GH cell 12, like the case of the invention of the earlier application, assigned to the same applicant. More particularly, when the polarizer 11 is moved to a position indicated by the imaginary line, the GH cell 12 can be taken out from the effective light pass. For a means of taking the polarizer 11 out or in, such a mechanical iris of the type shown in FIG. 8 may be used.

A rectangular wave was inputted in the GH cell 12 as a drive waveform to measure a change in light transmittance under conditions of applying a working voltage, revealing that, as shown in FIGS. 5A to 5C and FIG. 6, as the working voltage was applied to, an average transmittance of visible light (in air) was reduced from about 75% to several % with respect to the maximum transmittance. Although it depends on the structure of the liquid crystal cell used and the types of materials used, the GH cell 12 arrived substantially at a minimum transmittance by application of a pulse voltage of not smaller than ±5V (1 kHz).

When changed from the transparent state to the fully light-intercepted state or from the fully light-intercepted state to the transparent state like the case of 0V→±5V or ±5V→0V, light transmittance can respond at a relatively high speed. In this connection, however, where it was intended to slightly change the light transmittance in a half tone, it was sometimes experienced that a several-fold response time was required.

Figure 1A:
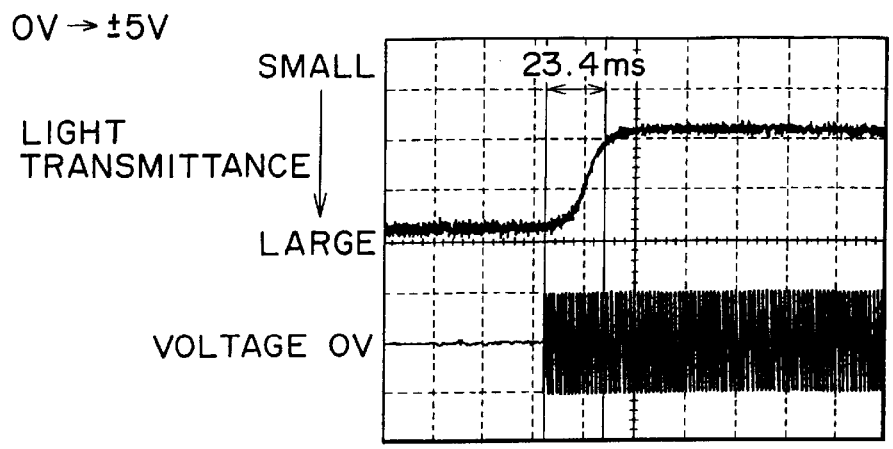
FIGS. 1A, 1B and 1C are, respectively, a graph illustrating an example of the results of an improved response time in a half tone region according to the invention.
Figure 1B:
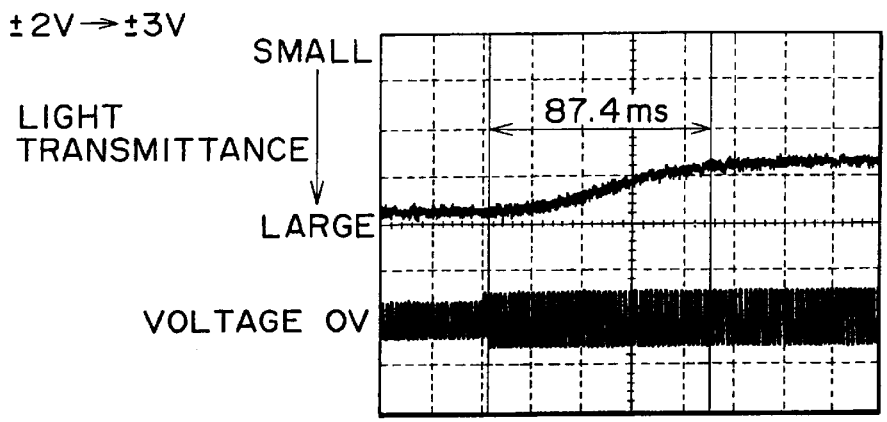

For instance, as shown in FIG. 1A, in case where the light transmittance responded in 23.4 ms relative to the change in drive voltage of 0V→±5V and the device was driven for half tone in such a way that ±2V→±3V as is particularly shown in FIG. 1B, the response time was worsened to an extent of 87.4 ms. Where it is intended to realize a pickup device using the liquid crystal cell as a light control element, such a lowering of the response speed as mentioned above will bring about a trouble in automatic adjustment of exposure.

Figure 1C:
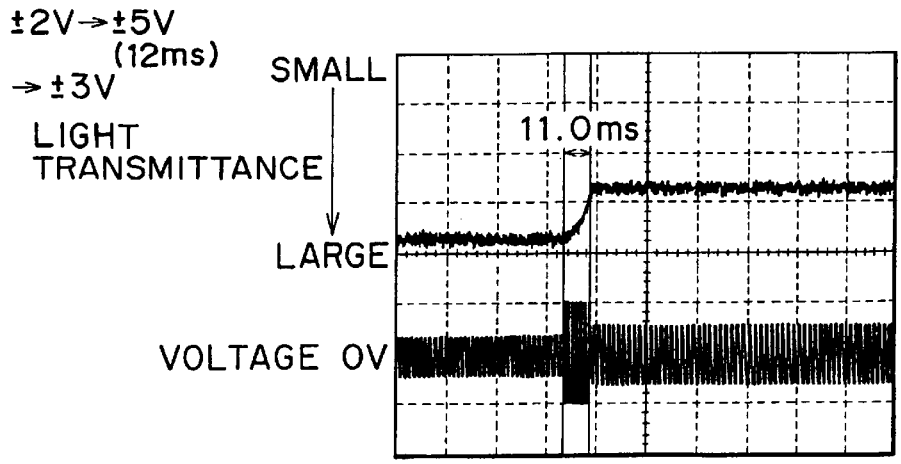

In order to solve the above problem, we have made intensive studies and, as a result, found that as is shown in FIG. 1C, if a drive waveform corresponding to the fully light-intercepted state (i.e. a minimum light transmittance) is inserted by an appropriate number of pulses prior to the drive waveform for an intended transmission, the response time can be significantly shortened.

For instance, in case where the cell was driven under conditions of ±2V→±3V, a rectangular wave of ±5V was inserted by 12 ms prior to the drive waveform of ±3V. As a result, a response time for light transmittance could be remarkably shortened from 87.4 ms to 11 ms.

Figure 2A:
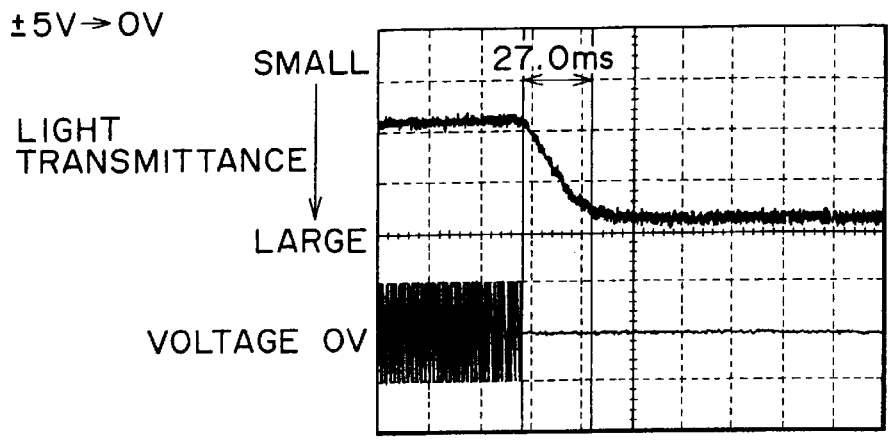
FIGS. 2A, 2B and 2C are, respectively, a graph illustrating another example of the results of an improvement of a response time in a half tone region according to the invention.
Figure 2B:
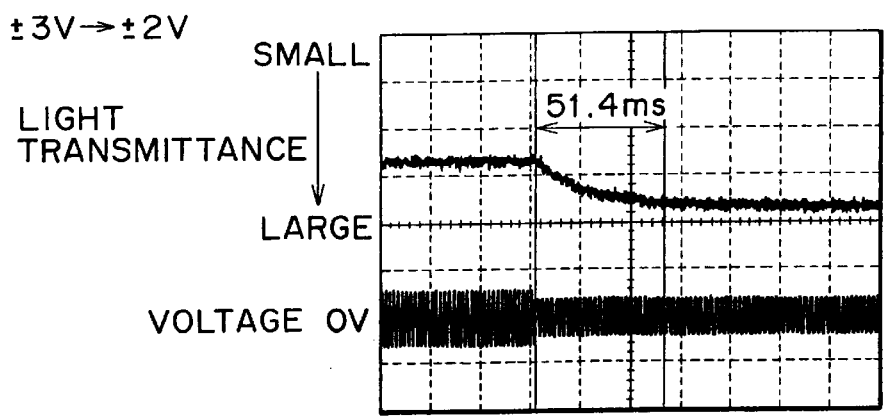
Figure 2C:
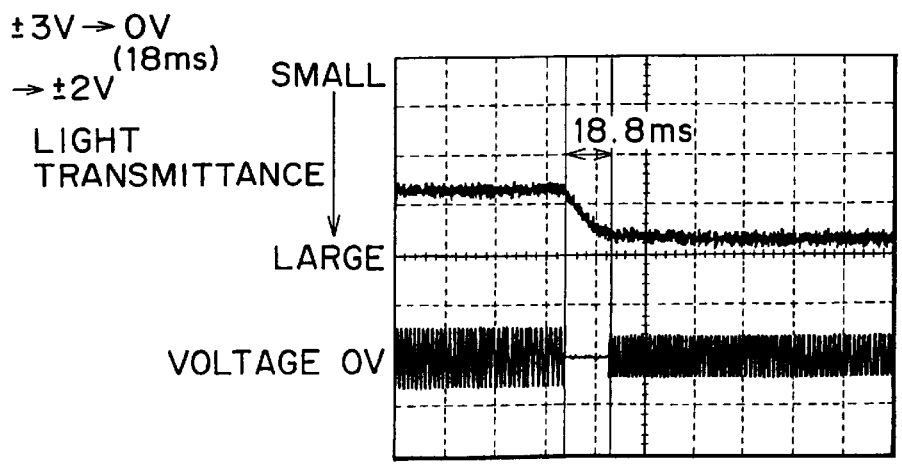

Likewise, where the cell was driven under conditions of ±3v ±2v, a drive waveform of 0V corresponding to the fully transparent state (i.e. a maximum light transmittance) was initially inserted by 18 ms prior to a drive waveform of ±2V. As a result, the response time of the light transmittance could be shortened from 51.4 ms in FIG. 2B to 18.8 ms as shown in FIG. 2C.

Figure 3A:
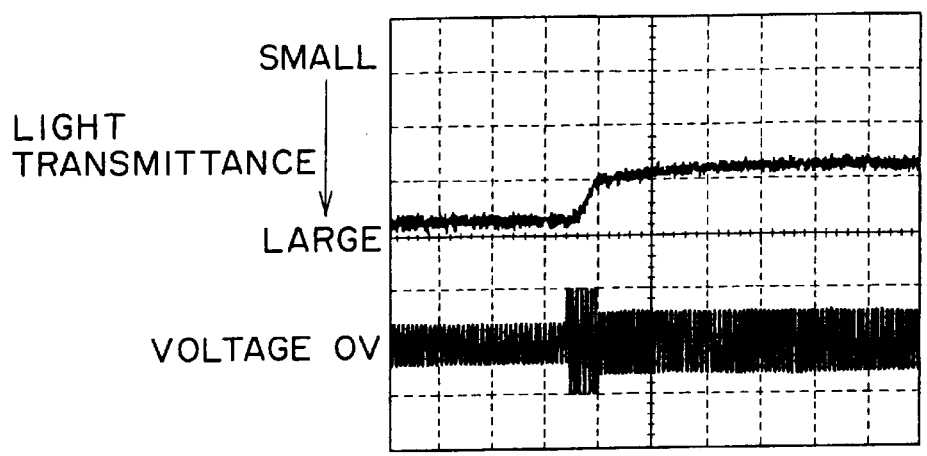
FIGS. 3A, 3B and 3C are, respectively, a graph illustrating an example of a drive pulse control for improving a response speed for a half tone.
Figure 3B:
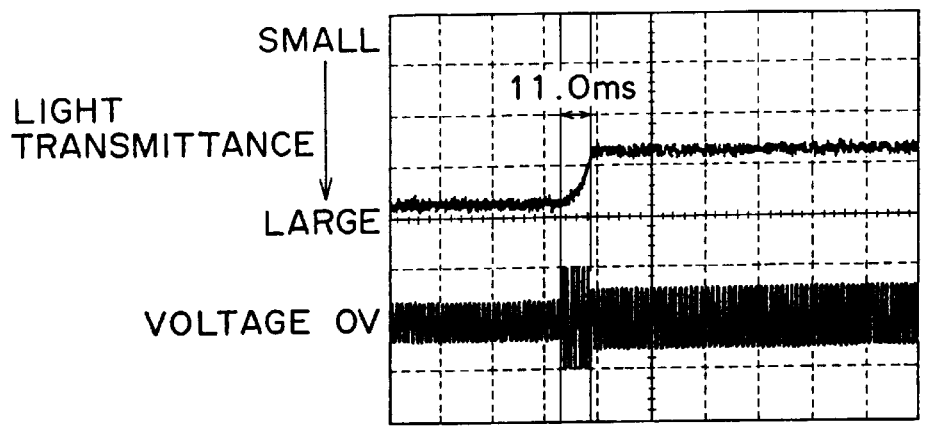
Figure 3C:
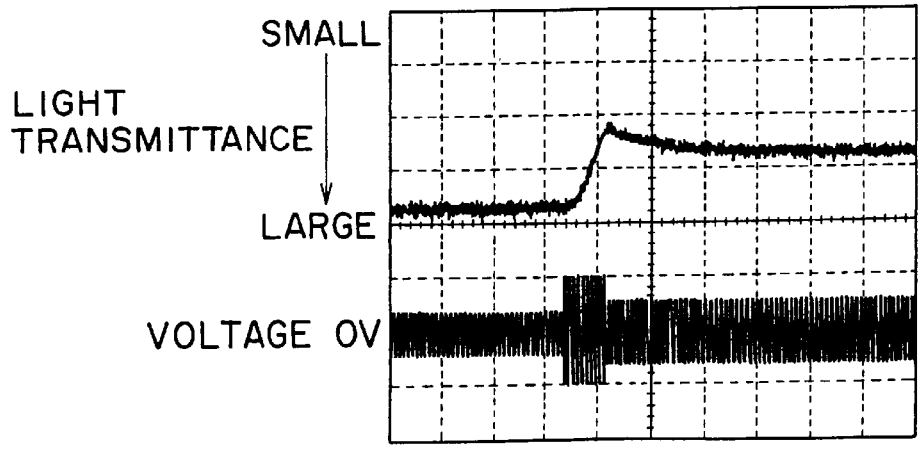

It will be noted that the initially inserted waveform, length of time and voltage in this example can be arbitrarily selected to an extent so as to permit easy control. However, the response for light transmittance becomes unsatisfactory when a pulse application times is too short as is shown in FIG. 3A. In addition, it is not favorable, as shown in FIG. 3C, to set such a long pulse application time as to overshoot an intended value. Accordingly, an appropriate pulse as shown in FIG. 3B should preferably be used.

EXAMPLE 2

In this example the driving method of the liquid crystal cell is carried out by changing from the pulse voltage or phase modulation (PHM) the pulse width modulation (PWM) to as stated in Example 1.

Figure 4A:
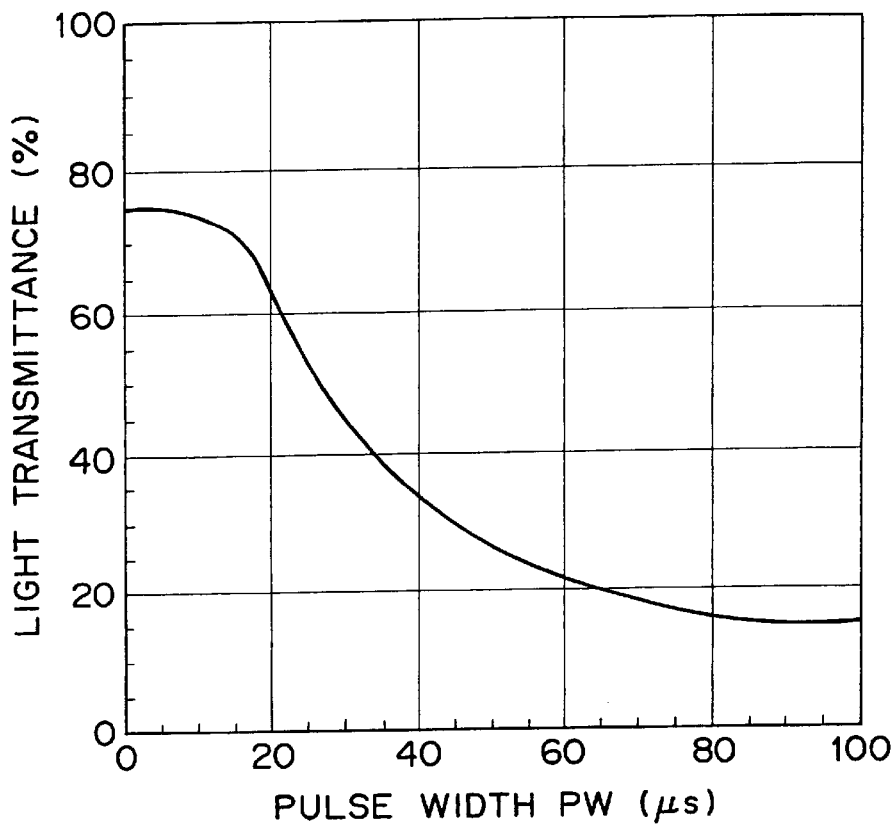
FIG. 4A is a graph showing the relation between the light transmittance of a light control device and the pulse width of a drive pulse.
Figure 4B:
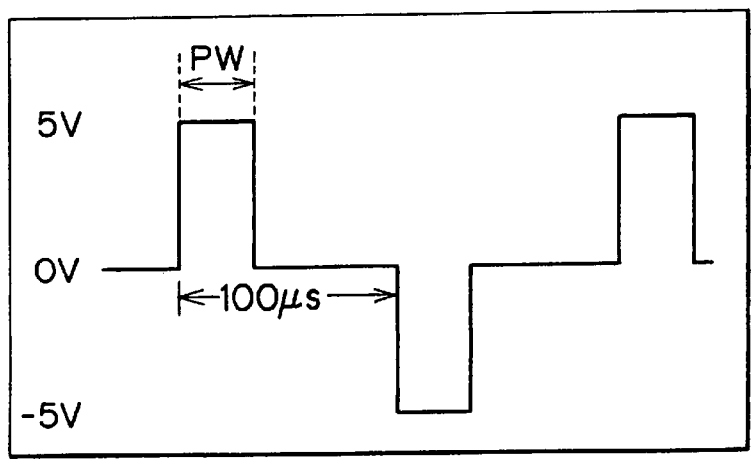
FIG. 4B is a graph showing a waveform of the drive pulse according to the invention.

For instance, a fundamental pulse generation period was taken as 100 $\mu$s, and the pulse width was controlled within this fundamental period, so that as shown in FIGS. 4A and 4B, as the pulse width increased, the average transmittance of visible light (in air) could be reduced from about 75% of the maximum light transmittance to several %, like such a pulse voltage modulation as set forth hereinabove.

Where a pulse peak value was fixed at 5V and the pulse width was so controlled as to change from a transparent state to a fully light-intercepted state of 0 $\mu$s→100 $\mu$s or a fully light-intercepted state to a transparent state of 100 $\mu$s→0 $\mu$s, the light transmittance responds at high speed to an extent. However, when the light transmittance was slightly changed for half tone, a several-fold response time was required as well.

For example, when the cell is driven for half tone under conditions of 20 $\mu$s→40 $\mu$s in case where the light transmittance responds in about 20 seconds relative to a change in drive pulse width of 0 $\mu$s→100 $\mu$s, the response time was worsened to an extent of about 90 ms. The lowering of the response speed will impede automatic adjustment of exposure in the case of realizing a pickup device using the liquid crystal cell as a light control element.

In order to solve the above problem, we have found that, when the cell is driven for half tone under the pulse width modulation (PWM), if a drive waveform corresponding to a fully transparent state (a minimum light transmittance) was initially inserted by several number of pulses of the pulse width, prior to the drive waveform, the response time can be significantly shortened.

When a rectangular wave with a pulse width of 100 $\mu$m was inserted by 10 ms prior to a drive waveform of 40 $\mu$s for driving by a change in pulse width of 20 $\mu$s→40 s in order to solve the above problem, the response time of the light transmittance could be remarkably shortened from about 90 ms to about 10 ms.

Likewise, when a drive waveform of 0 μs corresponding to a fully transparent state (i.e. a maximum light transmittance) was initially inserted by 18 ms prior to a drive waveform with a pulse width of 20 μs for driving by a change in pulse width of 40 μs→20 μs, the response time of the light transmittance could be shortened from about 70 ms to about 18 ms.

It will be noted that in this example, the time width and voltage of the initially inserted waveform can be arbitrarily selected to permit easy control. However, as stated hereinbefore, it is not favorable that the response of the light transmittance is so set as to overshoot an intended value.

Further, in this example, the cell is driven by use of a pulse width modulation, so that that the threshold voltage is lower than that attained by the pulse voltage modulation of Example 1 and characteristic properties are shifted toward a lower voltage side as a whole. The enables the control at a low voltage, thus leading to the reduction of consumption power. Moreover, because light transmittance changes gently, the transmittance can be readily controlled with a voltage, thereby improving gradation properties.

EXAMPLE 3

Figure 10:
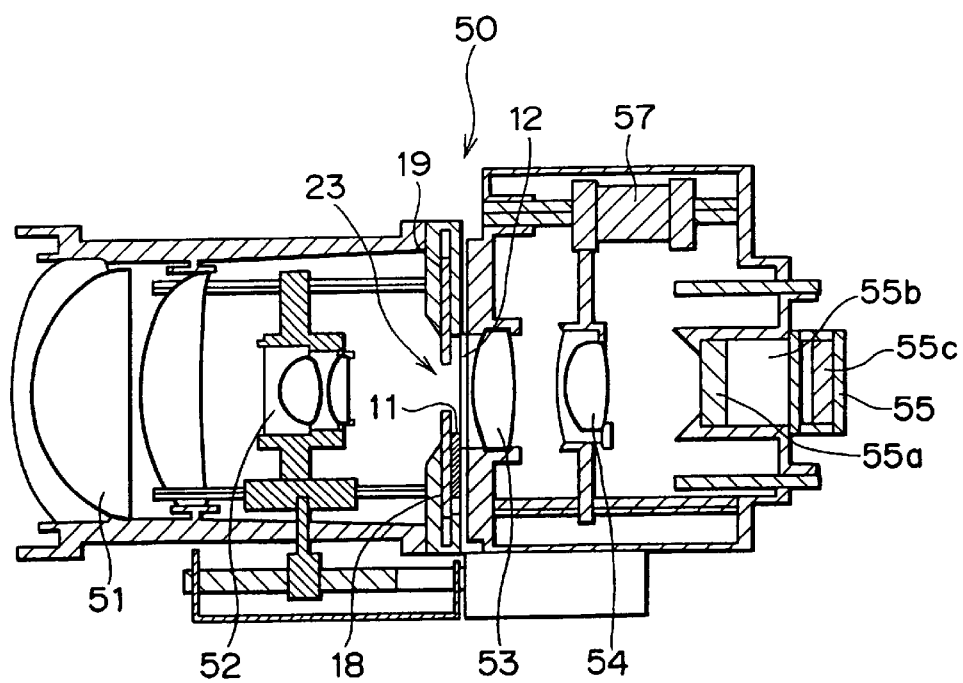
FIG. 10 is a schematic sectional view of a camera system assembling the light control device therein according to the invention.

FIG. 10 shows an example where the light control device 23 obtained by the above examples is assembled in a CCD (charge coupled device) camera.

More particularly, a CCD camera 50 includes, along an optical axis indicated by the dot-and-dash line, a first group of lenses 51 corresponding to the afore-indicated front group lenses and a second group of lenses 52 (for zooming), a third group of lenses 53 and a fourth group of lenses 54 (for focussing) corresponding to the afore-indicated rear group lenses, and a CCD package 55, which are provided in this order at appropriate intervals. The CCD package 55 accommodates therein an infrared cut filter 55a, an optical low pass filter system 55b and a CCD pickup element 55c.

Such a light control device 23 as set out hereinabove and based on the invention, which is composed of the GH cell 12 and the polarizer 11, is attached on the light path between the second group of lenses 52 and the third group of lenses 53 and nearer to the third group of lenses 53 in order to control the quantity of light (or to stop the light quantity). The fourth group of lenses 54 are provided movably by linear motor 57 along the light path between the third group of lenses 53 and CCD package 55, and the second group of lenses 52 for zooming are provided movably along the light path between the first group of lenses 51 and the light control device 23.

Figure 11:
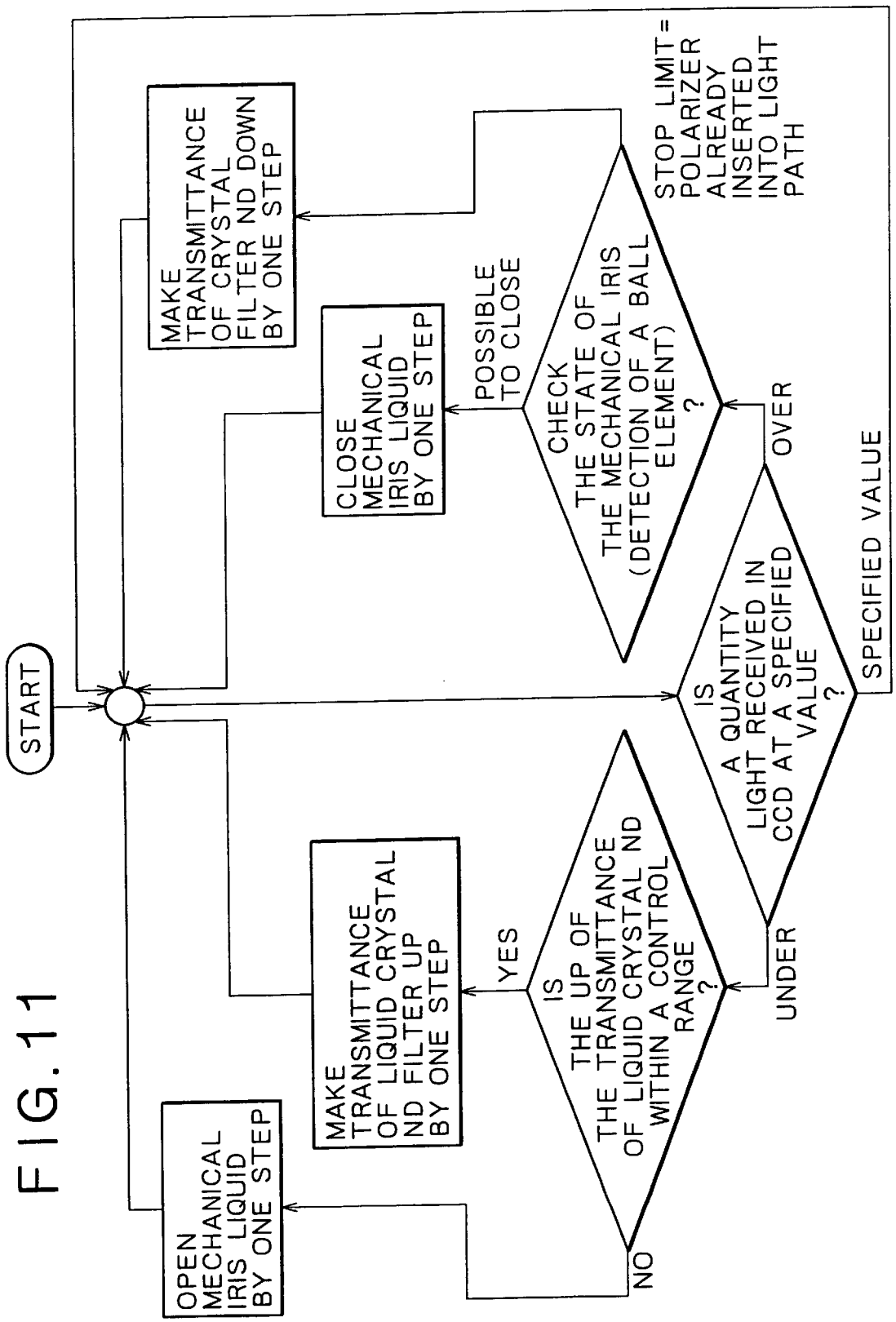
FIG. 11 is an algorithm showing the control of light transmittance in the camera system according to the invention.

FIG. 11 shows an algorithm of a sequence of controlling a light transmittance according to the light control device 23 in this camera system.

In this example, the light control device 23 of the invention is provided between the second group of lenses 52 and the third group of lenses 53, so that the quantity of light can be controlled by application of an electric field as stated hereinabove. Thus, the system can be made small in size and can be miniaturized substantially to an extent of an effective range of the light path. Accordingly, it is possible to achieve the miniaturization of the CCD camera. The quantity of light can be appropriately controlled by the magnitude of a voltage applied to the patterned electrodes, so that the diffraction phenomenon as-conventionally experienced can be prevented, and an amount of light sufficient for a pickup element can be passed, thereby preventing an image from being out of focus.

Figure 12:
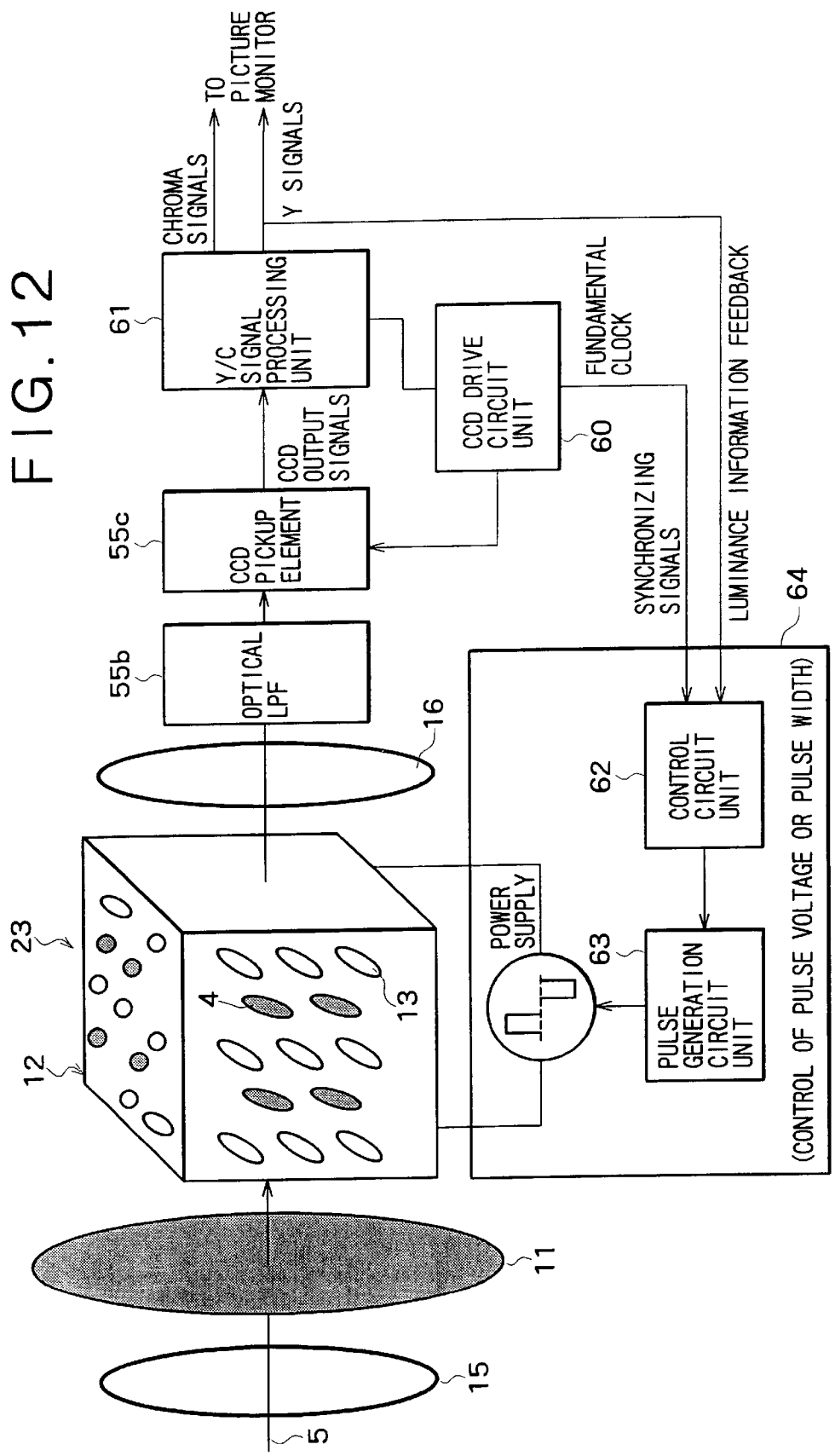
FIG. 12 is a block diagram showing a camera system including a drive circuit according to the invention

FIG. 12 is a block diagram showing a drive circuit of the CCD camera. As shown in this figure, the camera system includes a drive circuit unit 60 of a CCD pickup element 55c, which is provided at an outlet side of light from the light control device 23. The output signals from the CCD pickup element 55c are processed with a Y/C signal processor 61 and are fed back to a GH cell drive control unit 62 as luminance information (Y signals). Drive pulses that are controlled in pulse voltage or pulse width as having set out hereinbefore are obtained from a pulse generation circuit unit 63 by use of the control signals from the control circuit unit in synchronism with a fundamental clock of the drive circuit unit 60. The GH liquid crystal drive control 64 for controlling the pulse voltage or pulse width is constituted of the control circuit unit 62 and the pulse generation circuit unit 63.

It will be noted that in a system different from this camera system, the light outputted or transmitted from the light control device 23 is received with a photodetector (or a photomultiplier), from which the luminance information of the outputted light is fed back to the control circuit unit 62. After synchronization with the clock of the GH cell drive circuit unit (not shown), drive pulses having a controlled pulse voltage or pulse width are obtained from the pulse generation circuit unit.

The embodiments and examples of the invention have been described hereinabove, which may be varied and modified in various forms without departing from the technical concept of the invention.

For instance various variations may be made with respect to the structures of and types of materials for the liquid crystal cell and the light control device, and the drive mechanism, drive circuit and control circuit thereof. Any of a rectangular wave, trapezoidal wave, triangular wave and sine wave may be used for the drive waveform, and the inclination of liquid crystal molecules changes depending on the difference in potential between electrodes, thereby controlling light transmittance.

The light control device and the pickup device of the invention are convenient in where the drive electrode of the liquid crystal optical element is formed over the whole region of an effective light transmitting portion. The light transmittance can be generally controlled in high precision over the whole width of the effective light path by controlling the drive pulse applied to the drive electrode formed in this way.

Aside from those set out hereinbefore, a GH cell having a two-layered structure may be used. The position of the polarizer 11 relative to the GH cell 12 has been set between the front group lenses 15 and the rear group lenses 16, and is not limited thereto and may be optimally set in view of the setting conditions of pickup lenses. More particularly, so far as there is not used an optical element such as a phase difference film, wherein a polarization condition changes, the polarizer 11 may be located at an arbitrary position, for example, between the pickup face 17 and the rear group lenses 16 or at a side of a subject or at a side of the pickup element. Moreover, the polarizer may be located before or after a single lens that is used in place of the front group lenses 15 or the rear group lenses 16.

The iris blades 18, 19 may not be limited to two blades but may be made of a greater number of blades or may be made of only one blade. In addition, the iris blades 18, 19 are superposed through vertical movements thereof and may be moved in other directions or may be closed or stopped down from the periphery toward the center.

The polarizer 11 is attached to the iris blade 18 and may be attached to the iris blade 19.

As a subject becomes brighter, the polarizer 11 is initially taken out or in to control light, followed by absorption of the light with the GH cell 12. In contrast, it may be possible to initially control light by absorption of the light with the GH cell 12. In this case, after the transmittance through the GH cell 12 is lowered to a given value, the light is controlled by the polarizer 11 being taken out or in.

The mechanical iris is used as means for the polarizer 11 being taken out or in from the effective light path 20 and is not limited thereto. For instance, a film attached with the polarizer 11 may be attached directly to a drive motor so that the polarizer 11 may be taken out or in.

In the above examples, the polarizer 11 is taken out or in relative to the effective light path 20, and, as a matter of course, may be fixed in position in the effective light path.

The light control device of the invention may be used in combination with other types of known filter materials (e.g. an organic electrochromic material, a liquid crystal, an electroluminescent material and the like).

Further, the light control device of the invention may be widely applied, aside from an optical diaphragm of a pickup device such as the CCD camera illustrated hereinbefore, to light control, for example, of electrophotographic duplicators, optical communication machines and the like. Moreover, the light control device of the invention may be applied, aside from an optical diaphragm or a filter, to various types of image displays capable of displaying characters or images.

Thus, according to the invention, when a light transmittance of the liquid crystal element is slightly changed from an actual light transmittance to an intended light transmittance in a half tone region, a drive pulse for control is appropriately inserted beforehand corresponding to a fully light-intercepting state (a minimum light transmittance) or a fully transparent state (a maximum light transmittance) prior to insertion of a drive pulse corresponding to an intended light transmittance. As a result, the change in orientation of a liquid crystal or its relaxation smoothly proceeds, so that a response time before arriving at the intended light transmittance can be remarkably shortened over the case where a drive pulse corresponding to the intended light transmittance is merely applied to in a stepwise manner for driving.

What is claimed is:

1. A light control device comprising:
    a liquid crystal element; and
    a pulse control unit wherein when a transmittance of light transmitted through said liquid crystal element is changed from an actual light transmittance to a desired light transmittance,
    said pulse control unit inserts a preliminary drive pulse for controlling transmittance corresponding to a minimum light transmittance or a maximum light transmittance prior to application of an actual drive pulse corresponding to the desired light transmittance.

2. A light control device according to claim 1, wherein said preliminary drive pulse has a set pulse voltage and a pulse number.

3. A light control device according to claim 1, wherein said preliminary drive pulse has a fixed pulse width and pulse number.

4. A light control device according to claim 1, wherein said liquid crystal element is a guest-host type liquid crystal element wherein a negative type liquid crystal is used as a host material and a dichromatic dye is used as a guest material.

5. A method for driving a light control device including a liquid crystal element, wherein when a transmittance of light transmitted from said liquid crystal element is changed from a current light transmittance to a desired light transmittance, a preliminary drive pulse corresponding to a minimum light transmittance or a maximum light transmittance is inserted prior to application of a drive pulse corresponding to said desired light transmittance.

6. A method for driving a light control device according to claim 5, wherein said preliminary drive pulse has a fixed pulse voltage and a pulse number.

7. A method for driving a light control device according to claim 5, wherein said preliminary drive pulse has a fixed a pulse width and a fixed pulse number.

8. A method for driving a light control device according to claim 5, wherein said liquid crystal element is a guest-host type liquid crystal element wherein a negative type liquid crystal is used as a host material and a dichromatic dye is used as a guest material.

9. An image pickup device comprising:
    a light control device including a liquid crystal element arranged in a light path;
    wherein said light control device has a pulse control unit wherein when a transmittance of light transmitted through said liquid crystal element is changed from a current light transmittance to a desired light transmittance the pulse control unit inserts a preliminary drive pulse corresponding to a minimum light transmittance or a maximum light transmittance prior to application of a drive pulse corresponding to the desired light transmittance.

10. An image pickup device according to claim 9, wherein said preliminary drive pulse has a fixed pulse voltage and a pulse number.

11. An image pickup device according to claim 9, wherein said preliminary drive pulse has a fixed control pulse width and pulse number.

12. An image pickup device according to claim 9, wherein said liquid crystal element is a guest-host type liquid crystal element wherein a negative type liquid crystal is used as a host material and a dichromatic dye is used as a guest material.

13. A light control device comprising:
    a liquid crystal element; and
    a pulse control unit wherein when a transmittance of light transmitted through said liquid crystal element is changed from an actual light transmittance to a desired light transmittance,
    said pulse control unit inserts a preliminary drive pulse for controlling transmittance corresponding to substantially a minimum light transmittance or substantially a maximum light transmittance prior to application of an actual drive pulse corresponding to a desired light transmittance.

14. A light control device comprising:
    a liquid crystal element; and
    a pulse control unit wherein when a transmittance of light transmitted through said liquid crystal element is changed from an actual light transmittance to a desired light transmittance,
    said pulse control unit inserts a preliminary drive pulse for controlling transmittance corresponding to an interim value between a current drive value and a desired drive value.

* * * * *